United States Patent
Lorenz

(10) Patent No.: US 10,723,215 B2
(45) Date of Patent: Jul. 28, 2020

(54) CLUTCH DEVICE FOR A HYBRID DRIVE SYSTEM

(71) Applicant: SCHAEFFLER TECHNOLOGIES AG & CO. KG, Herzogenaurach (DE)

(72) Inventor: Elmar Lorenz, Rheinmuenster Soellingen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 158 days.

(21) Appl. No.: 15/753,216

(22) PCT Filed: Aug. 10, 2016

(86) PCT No.: PCT/DE2016/200364
§ 371 (c)(1),
(2) Date: Feb. 16, 2018

(87) PCT Pub. No.: WO2017/028854
PCT Pub. Date: Feb. 23, 2017

(65) Prior Publication Data
US 2018/0236865 A1 Aug. 23, 2018

(30) Foreign Application Priority Data
Aug. 20, 2015 (DE) .......................... 10 2015 215 874

(51) Int. Cl.
*B60K 6/387* (2007.10)
*F16D 21/06* (2006.01)
(Continued)

(52) U.S. Cl.
CPC ................ *B60K 6/387* (2013.01); *B60K 6/40* (2013.01); *B60K 6/48* (2013.01); *F16D 21/06* (2013.01);
(Continued)

(58) Field of Classification Search
CPC .. F16D 21/06; F16D 21/08; F16D 2021/0661; F16D 2021/0692; H02K 7/108
See application file for complete search history.

(56) References Cited

U.S. PATENT DOCUMENTS 4,312,434 A * 1/1982 Ballendux ........... F16D 25/0638
192/48.613
9,193,255 B2 11/2015 Arnold et al.
2015/0024903 A1 1/2015 Jeong et al.

FOREIGN PATENT DOCUMENTS

DE 102007003107 A1 8/2007
DE 102009059944 A1 7/2010
(Continued)

OTHER PUBLICATIONS

International Search Report for Application No. PCT/DE2016/200364, dated Jan. 4, 2017, 5 pages.

*Primary Examiner* — Huan Le
(74) *Attorney, Agent, or Firm* — Brooks Kushman P.C.

(57) ABSTRACT

A clutch device comprising a first and a second input side, a first and a second output side, wherein the first and second input sides and the first and second output sides are configured to rotate about a common rotation axis. The clutch device also includes a first clutch between the first input side and the first output side, a second clutch between the first input side and the second output side, wherein the first and second clutch are offset axially relative to one another, and a third clutch between the first input side and the second input side.

20 Claims, 5 Drawing Sheets

(51) Int. Cl.
    *H02K 7/108*    (2006.01)
    *F16D 21/08*    (2006.01)
    *B60K 6/40*     (2007.10)
    *B60K 6/48*     (2007.10)
    *B60K 6/12*     (2006.01)

(52) U.S. Cl.
    CPC ............ *F16D 21/08* (2013.01); *H02K 7/108* (2013.01); *B60K 2006/126* (2013.01); *B60K 2006/4825* (2013.01); *F16D 2021/0661* (2013.01); *F16D 2021/0692* (2013.01)

(56) References Cited

FOREIGN PATENT DOCUMENTS

EP    2287487 A1    2/2011
EP    2517915 A1    10/2012

\* cited by examiner

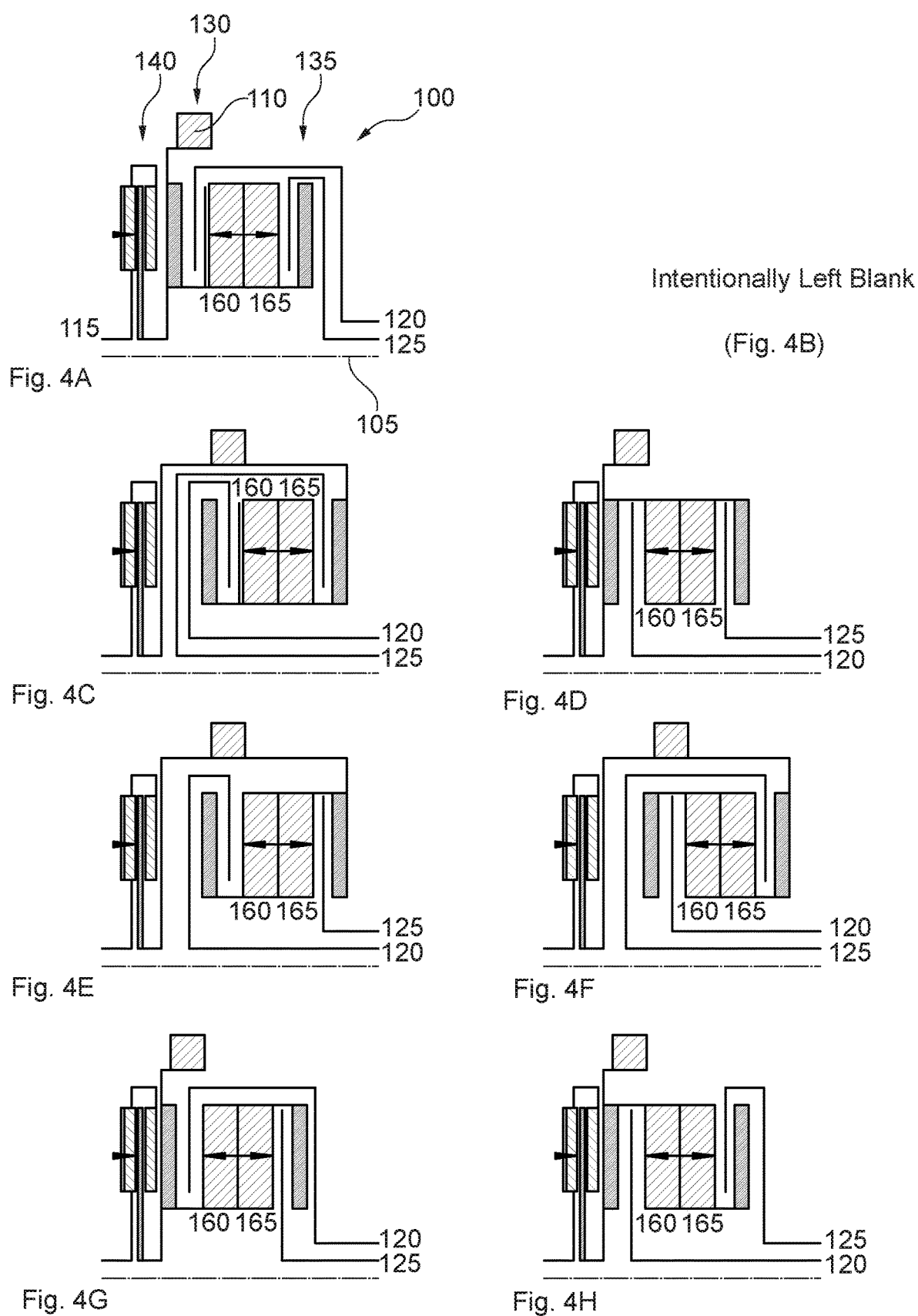

CLUTCH DEVICE FOR A HYBRID DRIVE SYSTEM

CROSS-REFERENCE TO RELATED APPLICATIONS

This application is the U.S. National Phase of PCT/DE2016/200364 filed Aug. 10, 2016, which claims priority to DE 102015215874.8 filed Aug. 20, 2015, the entire disclosures of which are incorporated by reference herein.

TECHNICAL FIELD

The disclosure relates to a clutch device. In particular, the disclosure concerns a clutch device for a hybrid drive system.

BACKGROUND

A motor vehicle has a first drive motor which is configured as an electrical machine, and a second drive motor which is configured as an internal combustion engine. The motor vehicle drive may be hybrid, i.e. use any arbitrary combination of the first and/or second drive motors. For this, a clutch device is provided between the drive motors and a transmission of the motor vehicle.

DE 10 2009 059 944 A1 describes a clutch device for a motor vehicle with hybrid drive.

SUMMARY

The disclosure is based on the object of indicating additional options for the configuration of a clutch device which may also be used in a hybrid drive system. The disclosure achieves this as described in embodiments below.

A clutch device comprises a first input side and a second input side, a first output side and a second output side, wherein the input sides and the output sides can be rotated about a common rotation axis. The clutch device furthermore comprises a first clutch between the first input side and the first output side, and a second clutch between the first input side and the second output side. In addition, a third clutch is provided between the first input side and the second input side.

The first and the second clutch may be offset axially relative to one another. Here, it is possible to conceive of different variants as to the actuating directions of the first and the second clutch relative to one another.

In a first variant, the axial actuating directions for the first and the second clutch are toward one another.

In a second variant, the axial actuating directions for the first and the second clutch are in the same direction toward the third clutch.

In a third variant, the axial actuating directions for the first and the second clutch are away from one another.

In a fourth variant, the axial actuating directions for the first and the second clutch are the same in a direction away from the third clutch.

All three clutches may be arranged in a common housing which is partially filled with a liquid medium. The liquid medium, in particular an oil, may serve for cooling, cleaning and lubrication of clutch components.

The hydraulic actuator devices may be provided for actuating the clutches. At least one of the clutches may be actuated hydraulically. The first and second clutches may also be actuated by the same principle, in particular both hydraulically. The third clutch may also be actuated hydraulically. An actuating fluid of a hydraulic actuator device may comprise the liquid medium with which the housing is at least partially filled.

The first input side may be configured for connection to a rotor of an electrical machine. In particular, the rotor may be radially outwardly surrounded by a stator of the electrical machine. This allows a compact drive unit which integrates both the clutch device and the electrical machine.

Also, the second input side may be configured for connection to an output shaft of an internal combustion engine.

BRIEF DESCRIPTION OF THE DRAWINGS

The disclosure is now explained in more detail below with reference to the attached figures, in which:

FIG. 4 shows a diagrammatic illustration of various embodiments of the clutch device in FIG. 1 according to a third variant.

DETAILED DESCRIPTION

Figure 1:
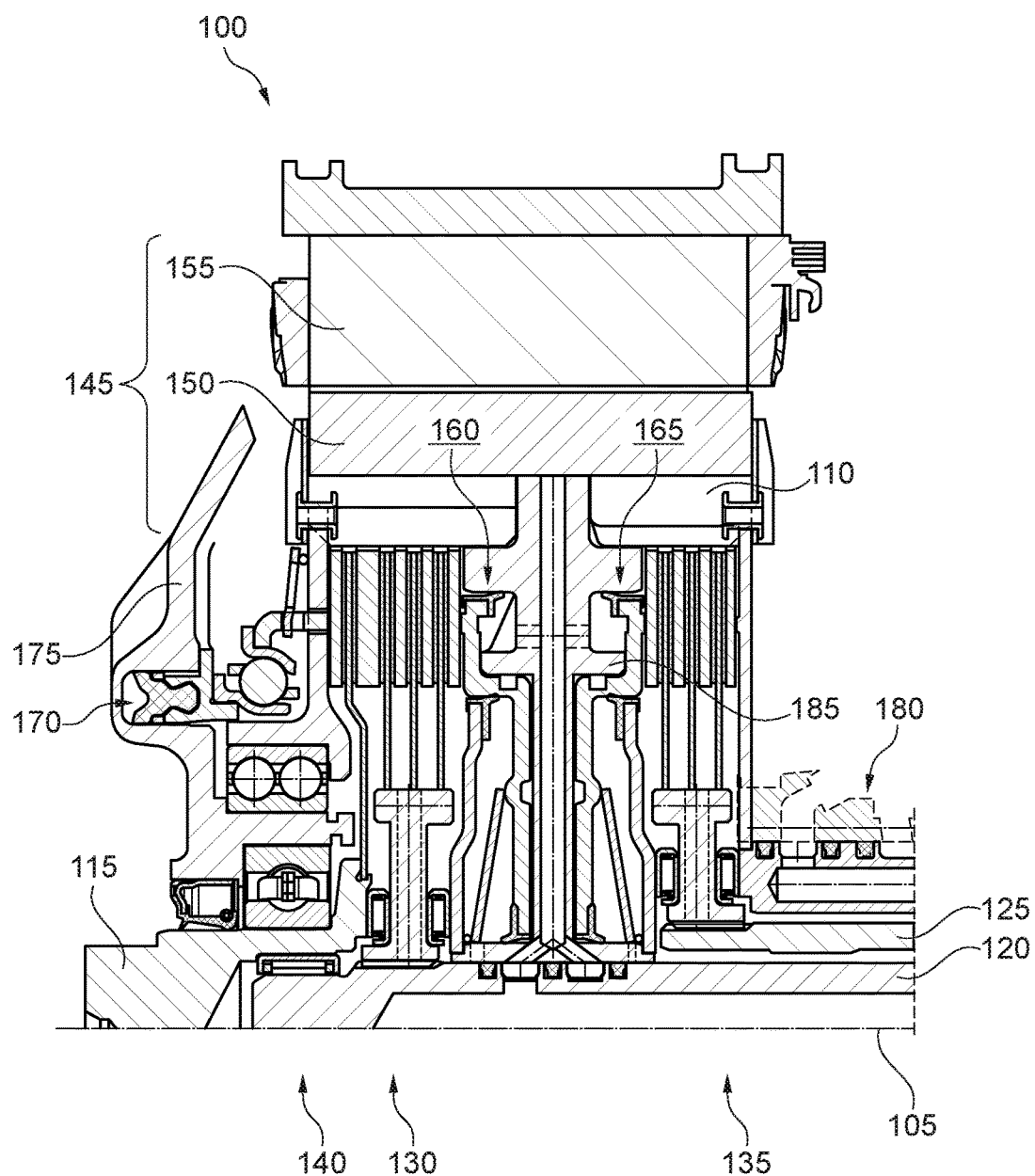
FIG. 1 shows an exemplary clutch device.

FIG. 1 shows an exemplary clutch device 100. A first input side 110, a second input side 115, a first output side 120 and a second output side 125 are arranged around a rotation axis 105.

A first clutch 130 lies between the first input side 110 and the first output side 120, a second clutch 135 lies between the first input side 110 and the second output side 125, and an optional third clutch 140 lies between the first input side 110 and the second input side 115. The first two clutches 130 and 135 are offset radially or may be offset axially to each other and form an axial double clutch. The third clutch 140 may be offset axially relative to at least one of the two other clutches 130 and 135.

The first input side 110 is configured for connection to an electrical machine 145 which in general comprises a rotor 150 and a stator 155. The electrical machine 145 may be an internal rotor type, wherein the rotor 150 lies radially inside the stator 155. The stator 155 may include at least one magnetic coil, and the rotor 150 comprises at least one permanent magnet. The rotor 150 may lie radially outside the clutches 130, 135 and 140, and in the embodiment shown is connected to the first input side 110 by using riveting. The second input side 115 may be configured for connection to a combustion machine, in particular an internal combustion engine, which may be a reciprocating piston engine.

The output sides 120 and 125 are configured for connection to input shafts of a double gearbox (not shown). The double gearbox is normally configured to couple each of the input shafts to a common output shaft by means of a separate gearwheel pair. If the drive train is arranged in a motor vehicle, the output shaft may finally act on a drive wheel of the motor vehicle. In order to select a gear, usually one of the clutches 130, 135 is closed while the respective other clutch 130, 135 is opened. The double gearbox may include several gearwheel pairs on each gearbox shaft, each pair forming a gear stage. A gearwheel pair may usually be engaged or disengaged when it is connected to an output shaft 120, 125, the assigned clutch 130, 135 of which is already opened.

The clutch device 100 in particular is configured to be used in the drive train of a motor vehicle. The motor vehicle may preferably have hybrid drive, i.e. be driven either by the internal combustion engine, or by the electrical machine 145, or alternatively by both drive motors. If the internal combustion engine is used, the third clutch 140 is closed. If the electrical machine 145 is used, it is normally actuated electrically such that torque can be transferred. The two drive motors may apply both positive and negative torque to the drive train. The electrical machine 145 may also receive kinetic energy from the drive train and convert this into electrical energy, which for example may be temporarily stored in an energy accumulator. Because of its compact structure, the clutch device 100 is particularly suitable for installation transversely at the front of the motor vehicle.

A first actuator device 160 is assigned to the first clutch 130, a second actuator device 165 to the second clutch 135, and a third actuator device 170 to the third clutch 140. All three actuator devices 160, 165 and 170 may be hydraulic and are each configured to exert an axial force on one of the clutches 130, 135, 140, so that friction elements of the clutches 130, 135 or 140 are pressed axially against each other in order to generate a friction engagement and transmit a torque between the friction elements. The friction elements are each pressed together between the assigned actuator device 160, 165, 170 and an axial thrust bearing. Furthermore, the hydraulic actuator devices 160, 165, 170 may be actively controlled individually in that, by using e.g. a valve or pump, pressurized pressure medium is deliberately introduced into or discharged from a hydraulic pressure chamber of the respective actuator device 160, 165, 170. Alternatively for example, a centrifugal oil-controlled actuation may be provided.

The three clutches 130, 135 and 140 may be arranged in a common housing 175 which may be at least partially filled with a liquid medium 180, in particular an oil. The medium 180 may also be used as a working medium (hydraulic fluid) for one of the actuator devices 160, 165 and 170. The clutches 130, 135 and 140 may be each of the wet-running type and may be designed independently of each other as single plate or multiplate clutches. Further, the first clutch 130 and the second clutch 135 may be a multiplate type, in order to allow finely-controlled opening and closing of the torque flow through the clutches 130, 135. The third clutch 140 may also, as shown, be of the single plate type, wherein the third clutch 140 may be configured as a shift clutch which as far as possible is not operated under slip.

In the embodiment shown, a radial flange 185 is arranged axially between the first clutch 130 and the second clutch 135 as a thrust bearing, against which the clutches 130, 135 may be pressed by using the assigned actuator device 160, 165. Axial forces of the actuator devices 160, 165, 170 may be supported inside the clutch device 100, so that no resulting forces need be supported externally.

If the clutch device 100 is used in a drive train without the electrical machine 145, the third clutch 140 may also be omitted. The first input side 110 and the second input side 115 then coincide.

FIGS. 2 to 5 show diagrammatic illustrations of different embodiments of the clutch device 100 in FIG. 1. Here, a hatched rectangle with an axial arrow in each case represents an actuator device 160, 165 or 170, wherein the arrow indicates in which direction an axial force is applied when the actuator device 160, 165 or 170 is actuated to close an associated clutch 130, 135, 140. In all the figures, the third actuator device 170 shown is identical, but it can be provided in the form of different embodiments. In particular, it is also possible for the actuating direction to be in the opposite direction to that shown. Furthermore, the third actuator device 170 can also be supported in a manner different from that shown, in particular in combination with support for one of the other actuator devices 160, 165.

For greater ease of reference, an axial direction from a region of one of the clutches 130 and 135 toward the third clutch 140 is referred to below as "to the left" and an axial direction away from the third clutch is referred to as "to the right". Here, it is assumed that the output sides 120 and 125 are situated on the axial side remote from the third clutch 140. In other words, the output sides 120, 125 of the third clutch 140 are axially opposite the first two clutches 130, 135. Moreover, for greater ease of understanding, not all the reference signs are included in all the embodiments shown; the references can be found easily and unambiguously from a comparison with other embodiments.

By way of example, in considering clutches 130 and 135 in the following illustrations, the first clutch 130 is situated further to the left and the second clutch 135 is situated further to the right. The first clutch 130 is associated with the first actuator device 160 and provides a torque on the first output side 120. The second clutch 135 is associated with the second actuator device 165 and provides a torque on the second output side 125.

FIG. 2 shows embodiments of the clutch device 100 in which the actuating directions of the first clutch 130 and of the second clutch 135 are axially toward one another.

Figure 2A:
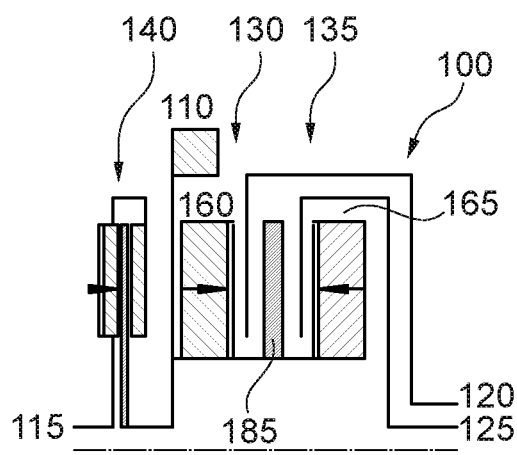
FIG. 2 shows a diagrammatic illustration of various embodiments of the clutch device in FIG. 1 according to a first variant.

In FIG. 2A, the torque from clutches 130 and 135 is in each case output radially outward and transferred to the right to the respective output sides 125 and 125.

Figure 2B:
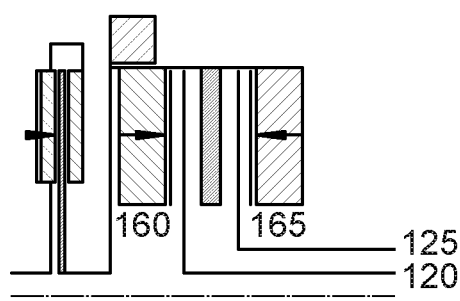

In FIG. 2B, the torque is output in a corresponding manner but radially inward.

Figure 2C:
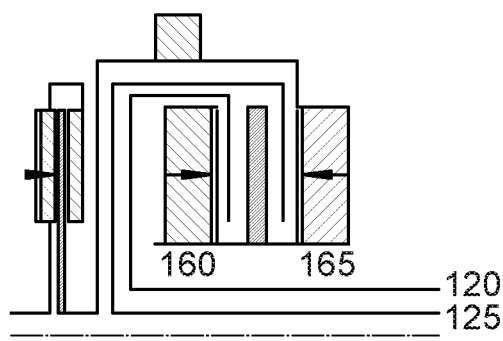

In FIG. 2C, the torque of both clutches 130, 135 is output radially outward, transferred axially to the left and, from there, radially inward to reach the output sides 120, 125.

Figure 2D:
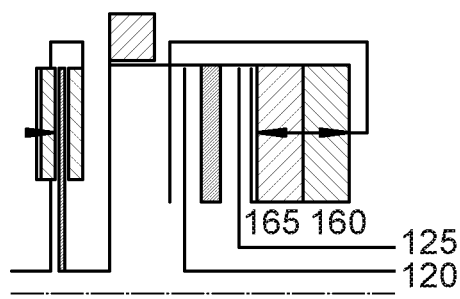

In FIG. 2D, the actuator devices 160, 165 rest axially against one another to the right of and adjacent to the flange 185. The first actuator device 160 acts on the first clutch 130 via an axial deflection to the left.

Figure 2E:
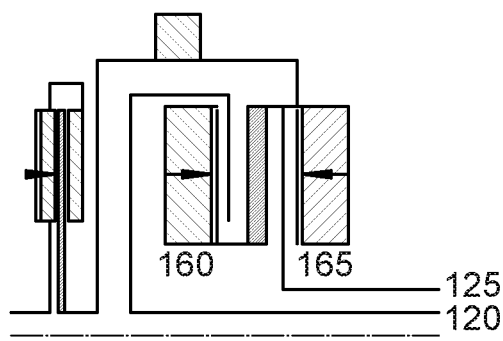

In FIG. 2E, the torque is output radially outward from the first clutch 130 and is then transferred axially to the left and radially inward. The torque of the second clutch 135 is simply output radially inward.

Figure 2F:
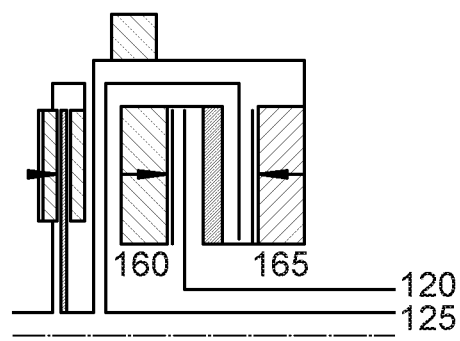

In FIG. 2F, there is a reverse deflection, in which the torque is output radially outward from the second clutch 135, then transferred axially to the left and radially inward, while the torque of the first clutch 130 is simply output radially inward.

Figure 2G:
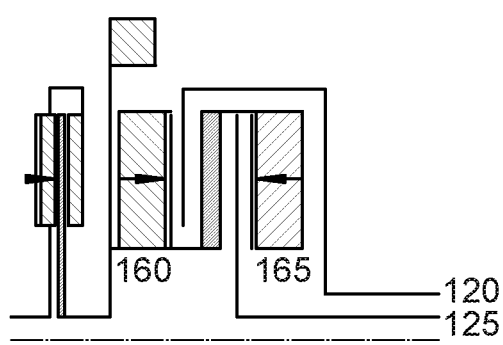

In FIG. 2G, the torque of the first clutch 130 is diverted radially outward, axially to the right and, from there, radially inward. The torque of the second clutch 135 is simply output radially inward.

Figure 2H:
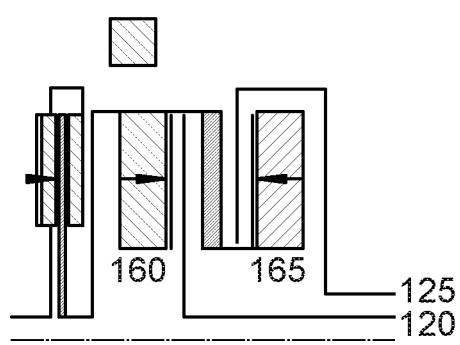

In FIG. 2H, the torque of the second clutch 135 is output radially outward, deflected axially to the right and transmitted radially inward. The torque of the first clutch 130 is taken off radially inward.

FIG. 3 shows embodiments of the clutch device 100 in which the actuating directions of the first clutch 130 and of the second clutch 135 are in the same axial direction, toward the third clutch 140, that is to say to the left in the illustration chosen.

Figure 3A:
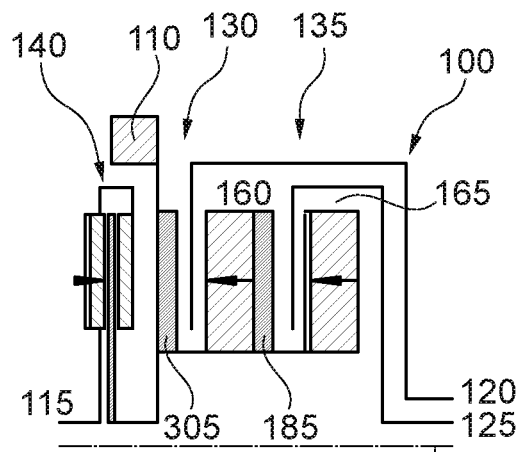
FIG. 3 shows a diagrammatic illustration of various embodiments of the clutch device in FIG. 1 according to a second variant.
Figure 3B:
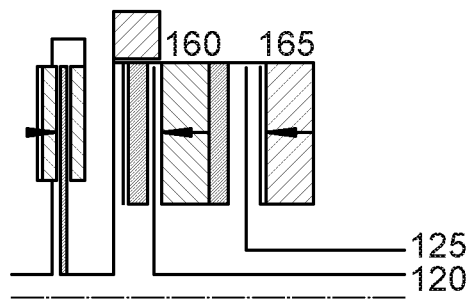
Figure 3C:
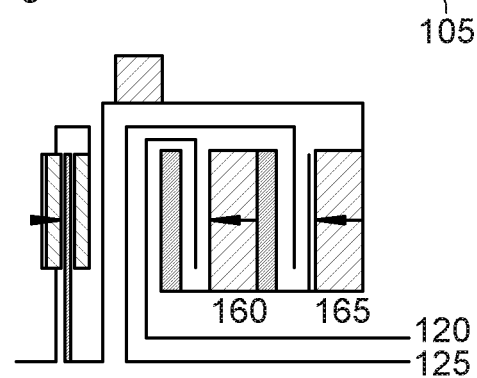
Figure 3D:
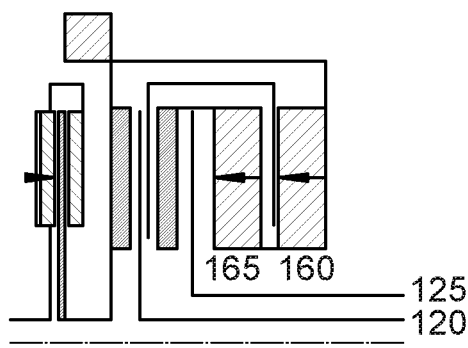
Figure 3E:
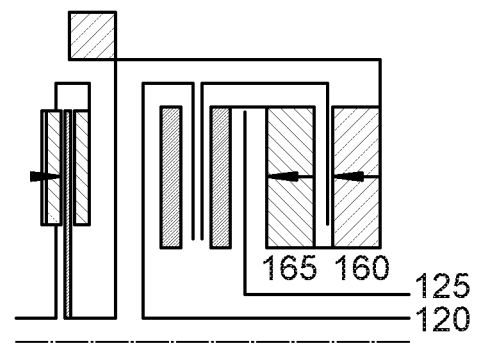
Figure 3F:
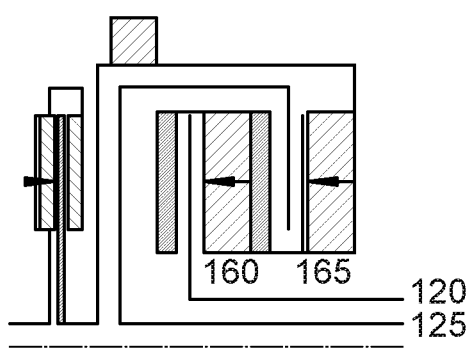
Figure 3G:
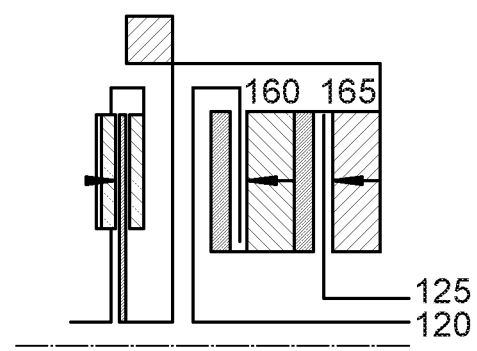
Figure 3H:
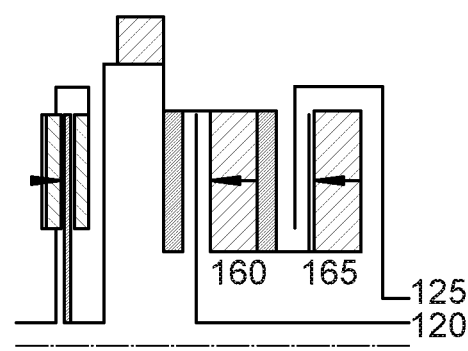
Figure 5A:
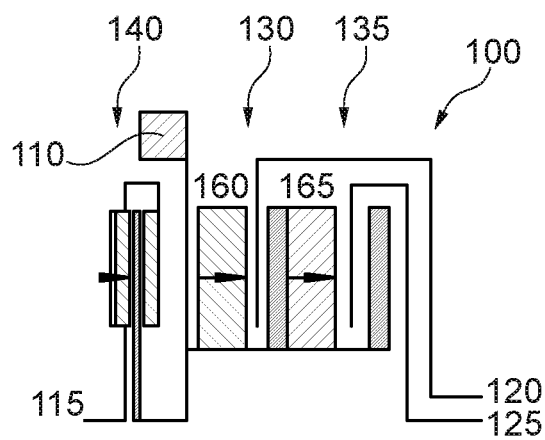
FIG. 5 shows a diagrammatic illustration of various embodiments of the clutch device in FIG. 1 according to a fourth variant.
Figure 5B:
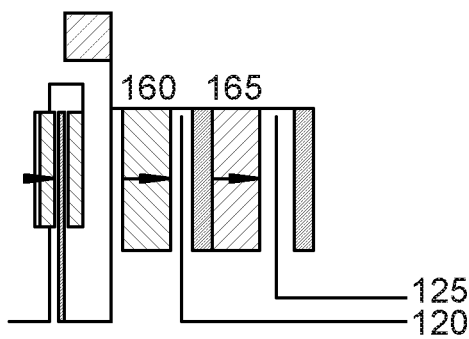
Figure 5C:
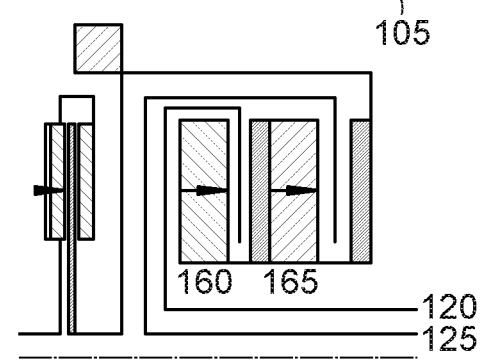
Figure 5D:
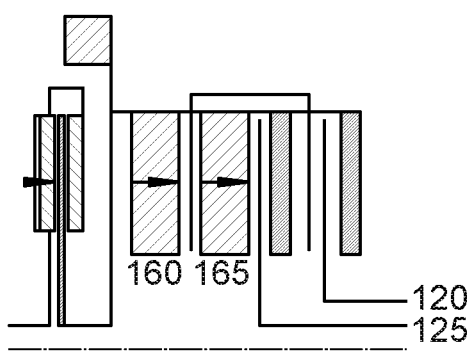
Figure 5E:
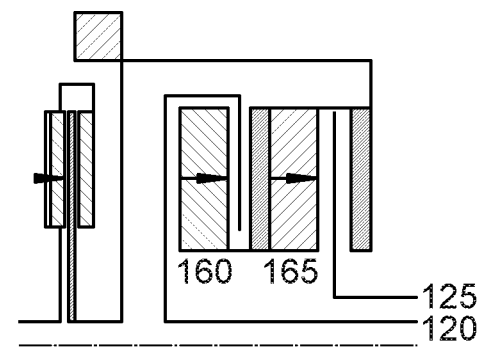
Figure 5F:
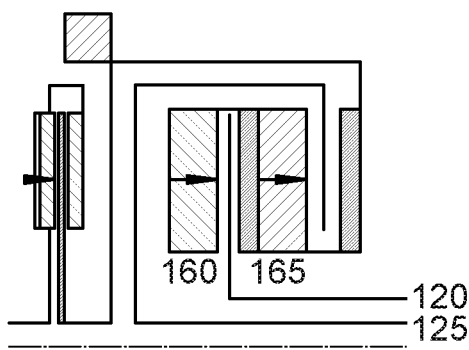
Figure 5G:
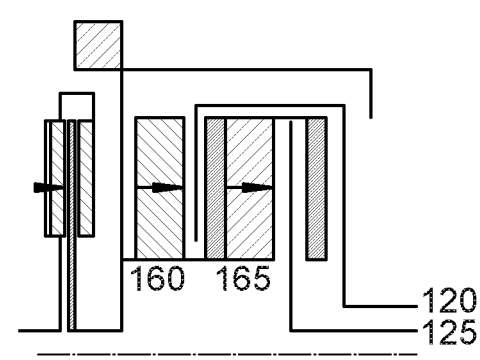
Figure 5H:
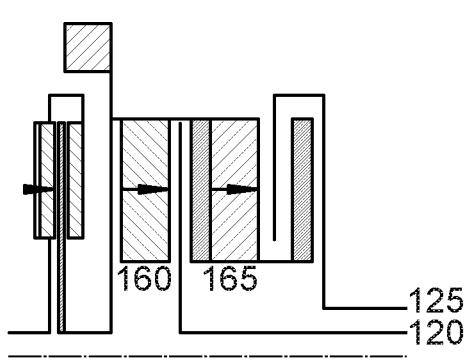

In FIG. 3A, the torque path is like that in FIG. 2A but a further flange 305 is provided, which serves as an axial thrust bearing for the first clutch 130.

The embodiments in FIGS. 3B to 3H correspond to those in FIGS. 2B to 2H, wherein the further flange 305 is in each case used as a thrust bearing for the first clutch 130.

FIG. 4 shows embodiments of the clutch device 100 in which the actuating directions 160, 165 of the first clutch 130 and of the second clutch 135 are axially away from one another. In this case, the actuator devices 160, 165 may rest axially against one another. In the embodiments illustrated, the further flange 305 is once again used to form a thrust bearing for the first clutch 130.

In respect of the transfer of the torque provided by the clutches 130, 135, the embodiments illustrated correspond in pairs to the embodiments in FIG. 3, although it should be noted that one embodiment 4B is not provided.

FIG. 5 shows embodiments of the clutch device 100 in which the actuating directions of the first clutch 130 and of the second clutch 135 are in the same axial direction, away from the third clutch 140. Thus, in the illustration chosen, the actuator devices 160 and 165 act to the right. Here, a further flange 505 is used to serve as an axial thrust bearing for the second clutch 135.

Once again, the illustrated embodiments 5A to 5H correspond in pairs to embodiments 3A to 3H, as regards the path of the torque provided respectively by clutches 130 and 135.

With different compositions of components or features described above with reference to FIGS. 2 to 5, the clutch device 100 can be adapted variably to a specific application. In particular, it may be simple to provide the clutch device 100 in corresponding variants with and without a third clutch 140. Thus the clutch device 100 may be used in particular on a small or medium-sized motor vehicle with or without electrical machine 145, i.e. with hybrid drive or conventional drive. The torque transmission, free from tensile forces, on selection of a gear can be utilized by the design of the clutch device 100 as a double clutch in conjunction with a double gearbox.

LIST OF REFERENCE DESIGNATIONS

100 Clutch device
105 Rotation axis
110 First input side
115 Second input side
120 First output side
125 Second output side
130 First clutch
135 Second clutch
140 Third clutch
145 Electrical machine
150 Rotor
155 Stator
160 First actuator device
165 Second actuator device
170 Third actuator device
175 Housing
180 Liquid medium
185 Flange
305 Further flange
505 Further flange

The invention claimed is:

1. A clutch device, comprising:
a first and a second input side;
a first and a second output side;
wherein the input sides and the output sides can be rotated about a common rotation axis;
a first clutch between the first input side and the first output side;
a second clutch between the first input side and the second output side; and
a third clutch between the first input side and the second input side, wherein the first and the second clutch are offset axially, and the first and second clutch radially overlap a rotor of an electrical machine about the common rotation axis, wherein the rotor is connected to either the first or second input side.

2. The clutch device of claim 1, wherein axial actuating directions for the first and the second clutch are toward one another.

3. The clutch device of claim 1, wherein axial actuating directions for the first and the second clutch are in the same direction toward the third clutch.

4. The clutch device of claim 1, wherein axial actuating directions for the first and the second clutch are away from one another.

5. The clutch device of claim 1, wherein axial actuating directions for the first and the second clutch are in the same direction away from the third clutch.

6. The clutch device of claim 1, wherein the first, second, and third clutches are arranged in a common housing which includes a liquid medium.

7. The clutch device of claim 1, wherein hydraulic actuator devices are provided for actuating the clutches.

8. The clutch device of claim 1, wherein the first input side is configured for connection to the rotor of the electrical machine.

9. The clutch device of claim 8, wherein the rotor is surrounded radially outwardly by a stator of the electrical machine.

10. The clutch device of claim 1, wherein the second input side is configured for connection to an output shaft of an internal combustion engine.

11. A clutch device comprising:
a first and a second input side;
a first and a second output side, wherein the first and second input sides and the first and second output sides are configured to rotate about a common rotation axis;
a first clutch between the first input side and the first output side;
a second clutch between the first input side and the second output side, wherein the first and second clutch are offset axially relative to one another, and the first and second clutch radially overlap a rotor of an electrical machine with respect to the common rotation axis, wherein the rotor is connected to either the first or second input side; and
a third clutch between the first input side and the second input side.

12. The clutch device of claim 11, wherein axial actuating directions for the first and the second clutch are toward one another.

13. The clutch device of claim 11, wherein axial actuating directions for the first and the second clutch are in the same direction toward the third clutch.

14. The clutch device of claim 11, wherein an axial actuating direction for the first and the second clutch are away from one another.

15. The clutch device of claim 11, axial actuating directions for the first and the second clutch are in a same direction away from the third clutch.

16. The clutch device of claim 11, wherein the first, second, and third clutches are arranged in a common housing which includes a liquid medium.

17. The clutch device of claim 11, wherein one or more hydraulic actuator devices are configured to actuate at least one of the first, second, or third clutch.

18. The clutch device of claim 11, wherein the first input side is configured to connect to an electrical machine and the second input side is configured to connect to an output shaft of an engine.

19. The clutch device of claim 18, wherein the rotor is surrounded radially outwardly by a stator of the electrical machine.

20. A clutch device comprising:
   a first and a second input side;
   a first and a second output side; and
   a common housing, including:
      a first clutch between the first input side and the first output side;
      a second clutch between the first input side and the second output side, wherein the first and second clutch are offset axially relative to one another, and the first and second clutch overlap a rotor of an electrical machine radially with respect to the common rotation axis, wherein the rotor is connected to either the first or second input side; and
      a third clutch between the first input side and the second input side.

* * * * *